Figure 1:
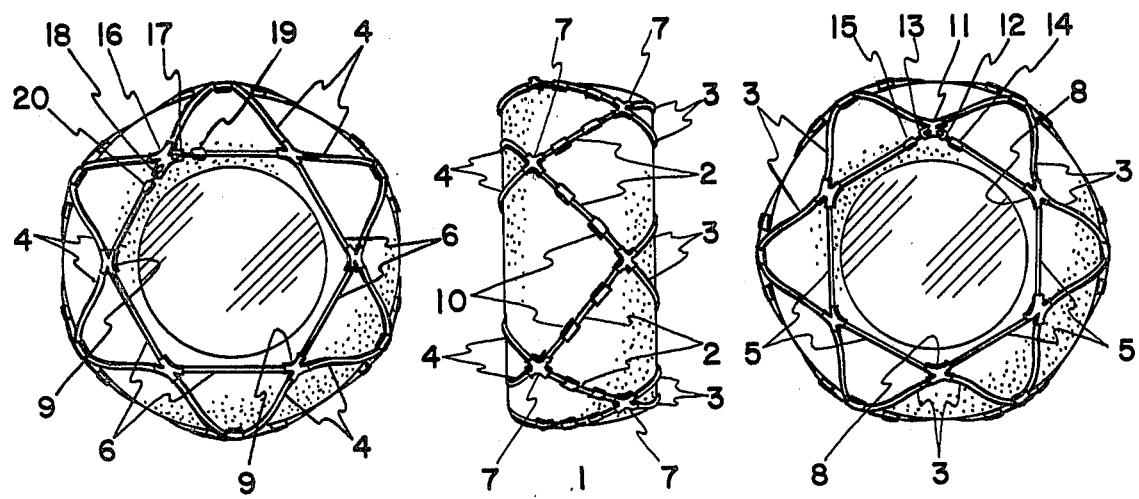

United States Patent [19]

Lew

[11] 4,304,280
[45] Dec. 8, 1981

[54] EASY TO INSTALL CONTINUOUS SNOW CHAIN

[76] Inventor: Hyok S. Lew, 7890 Oak St., Arvada, Colo. 80005

[21] Appl. No.: 75,495

[22] Filed: Sep. 13, 1979

Related U.S. Application Data

[63] Continuation-in-part of Ser. No. 876,696, Feb. 10, 1978, abandoned.

[30] Foreign Application Priority Data

Jun. 7, 1979 [CA] Canada ................................. 329276

[51] Int. Cl.³ ............................................ B60C 27/00
[52] U.S. Cl. ................................. 152/221; 152/225 R; 152/241
[58] Field of Search ............... 152/221, 222, 218, 219, 152/217, 225 R, 241

[56] References Cited

U.S. PATENT DOCUMENTS

| | | | |
|---|---|---|---|
| 2,346,477 | 4/1944 | Ederer | 152/221 |
| 2,830,639 | 4/1958 | Clark | 152/239 |
| 3,842,881 | 10/1974 | Muller et al. | 152/217 X |
| 3,934,633 | 2/1975 | Bula | 152/221 |
| 4,111,251 | 9/1978 | Bula | 152/219 |

Primary Examiner—John E. Kittle
Assistant Examiner—Thomas Bokan

[57] ABSTRACT

A snow chain for the automobile tires employing a single or a plurality of traction cords disposed circumferentially over the tread surface of the tire in a zig-zag pattern or diamond pattern, which traction cords are held in position by a pair of star-shaped tie cord assembly respectively disposed on each side of the tire, is disclosed. The outer points of each of said star-shaped tie cord assembly are connected to said traction cord in such a way that the tension on tie cords stretches the traction cord into a zig-zag or diamond pattern as said traction cord is being tightened over the tire tread surface. The inner points of each of said star-shaped tie cord assembly are slidably engaged by a retaining cord, which sliding relationship enables the retaining cord loop to expand and be slipped over the circumference of the tire, which arrangement ensures the easy installation and take off of said snow-chain.

4 Claims, 10 Drawing Figures

EASY TO INSTALL CONTINUOUS SNOW CHAIN

This is a continuation-in-part application of a patent application Ser. No. 876,696 entitled "Continuous Snow Chain", which was filed on Feb. 10, 1978 abandoned.

A great deal of natural resources and manpower are wasted every winter in plowing the snow and spreading the sand and salt on the road surfaces. Such a practice is not only economically wasteful but also harmful to the environment. This wasteful and harmful practice can be eliminated if every driver uses the snow chains. The snow tire provides an adequate traction for the fair to good road condition of the snow covered road. However, the snow tires do not help much for adverse road condition wherein a highly slippery road surfaces are created by the compacted snow or ice. In spite of the excellent traction provided by the snow chains which is far superrior to the snow tire, most drivers refuse to use the snow chain. There are three major reasons for the unpopularity of the conventional snow chains: Firstly, it is difficult and awakard to install and take off the present day snow chains. Secondly, the noise and pounding caused by the conventional snow chain, when driven on the bare road surface between the snow covered road segments is emotionally unbearable to the driver and, mechanically damaging to the automobile. Thirdly, the low speed limit imposed by the conventional snow chain is unacceptable to many drivers.

The primary object of the present invention is to provide a snow chain that rolls smoothly and quietly on all different road surface conditions while providing the necessary traction.

Another object of the present invention is to provide a snow chain which is easy to install and take off.

A further object of the present invention is to provide a snow chain which enables to drive the automobile at a high speed on the snow covered roads as well as on bare road surfaces.

Still another object of the present invention is to provide a snow chain which is compact and light weight.

Still a further object of the present invention is to provide a snow chain wherein the retaining cord anchors the snow chain assembly in a sliding relationship whereby the retaining cord loop can be enlarged to slip over the circumference of the tire.

Yet another object of the present invention is to provide a snow chain of which retaining cord disposed on the inside of the tire can be tightened and locked from the outside of the tire.

These and other objects of the present invention will become clear as the description and specification of the present invention proceeds. The present invention may be described with greater clarity and specificity by refering to the FIGS. 1 through 10 showing different embodiments of the principles taught by the present invention.

Figure 5:
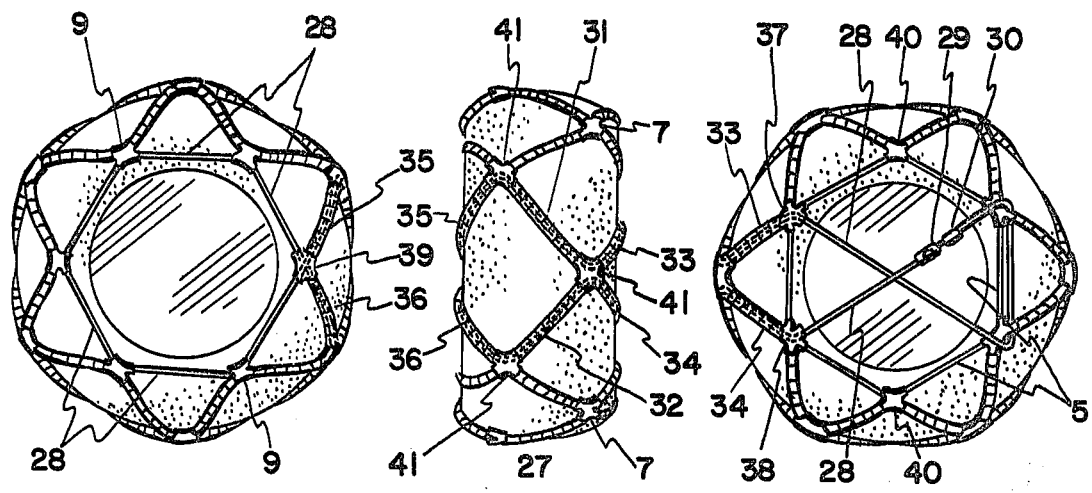

In FIG. 1, there is shown the inside, front and outside view of a snow chain constructed in accordance with the principle of the present invention. The "easy to install continuous snow chain" 1 comprise a traction cord 2 disposed circumferentially over the tread surface of the tire and a pair of star-shaped tie cords 3 and 4 respectively disposed on the outside and inside of the tire. The outer ends of the pair of star-shaped tire cords 3 and 4 are respectively connected to the traction cord 2 by means of the plurality of connectors 7. It should be noticed that the outer points of the pair of star-shaped tie cords 3 and 4 are connected to the traction cord 2 in a alternating pattern whereby the tension exerted on the pair of tie cords stretches the traction cord into a zig-zag pattern and tightens the traction cord around the tread surface of the tire. To provide additional tread, the traction beads 10 are disposed on the traction cord 2, which beads may be disposed continuously as shown in FIG. 5 or intermittently as shown in FIG. 1. The inner points of the star-shaped tie cord 3 are connected to a retainer cord 5 by means of connectors 8, which may be non-slidably disposed onto the tie cord 3 at each of inner points. However, the retaining cord 5 must engage each of the connectors 8 in a sliding relationship, which enables to open up the retaining cord loop to be slipped over the circumference of the tire in installing and taking off the snow chain. One of the connectors connecting the tie cord 3 and the retaining cord 5, which is designated by 11, has a pair of adapters 12 and 13, each of which is removably engaged by each ends 14 and 15 of the retaining cord. The inner points of the star-shaped tie cord 4 are connected to the retaining cord 6 by means of the connctors 9 which is engaged by the retaining cord 6 in a sliding relationship. One conector 16 is provided with a pair of adapter 17 and 18, each of which removably receives each ends 19 and 20 of the retaining cord 6. It should be understood that the ends of the retaining cords have an outside diameter greater than the inside diameter of the connectors 8 and 9, whereby, each of the retaining loop can be enlarged manifested by the sliding relationship between the retaining cords and the connectors without actually disengaging any of the connectors when the ends of the retaining cords are disengaged from the adaptors attached to one of the connectors. With this arrangement, the snow chain can be installed and taken off very easily in the following manner: After opening up both retaining cords, the snow chain can be slung over the top three quarter of the tire easily. Then move the automobile to rotate the tire over 180 degrees. Now the snow chain can be completely put around the tire by slipping the inside retaining cord over the circumference of the tire. Reach inside of the tire and engage the ends of the inside retaining cord to the appropriate adapters and then do the same to the outside retaining cord, which completes the installation of the snow chain. The snow chain can be readily taken off by following the installing procedure in reverse order.

Figure 2:
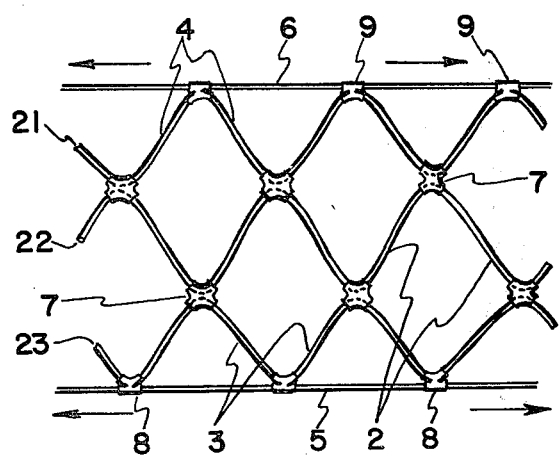
Figure 3:
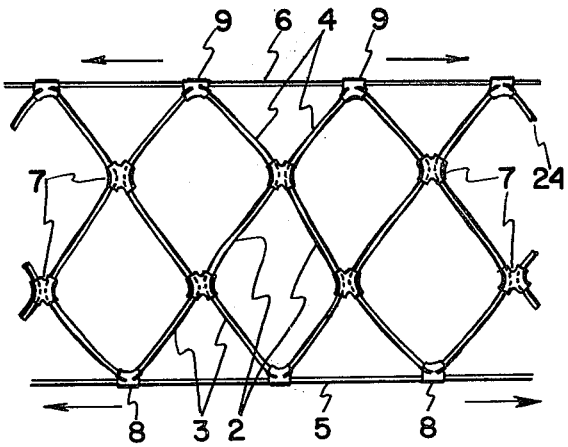
Figure 4:
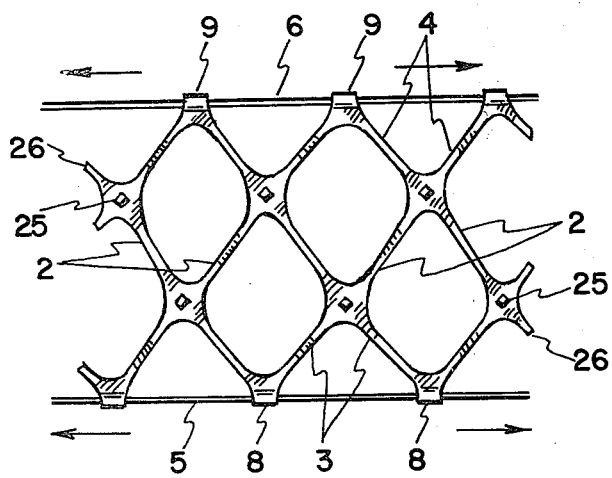

There are three preferable methods for constructing the snow chain shown in FIG. 1. The first method is shown in FIG. 2 wherein a single cord 22 is used to form the traction cord 2 while a pair of cords 21 and 23 are employed to form the pair of retaining cords 4 and 3, respectively. In this arrangement, it is obvious that each of the three cords has to be spliced once in forming closed loops. In FIG. 3, there is shown the second method, wherein a single cord 24 is employed to form the entire traction cord 2 as well as the tie cords 3 and 4, which arrangement require only single splicing of cord 24 in forming the entire snow chain. The third method is shown in FIG. 4, wherein the traction cord 2 and the pair of tie cords are formed or cut-out as a single integrated net-work 26, which method is particularly desirable when the snow chain is made of plastic materials. In order to provide a better traction, a plurality of studs 25 may be provided as shown in FIG. 4. Of course, the continuous snow chain shown in FIG. 1 can be constructed of the wire ropes with abrasion resisting beads threaded onto the elements in contact with the road surface or of the steel chain used in constructing the conventional snow chains or of the combination of the wire ropes and the steel chains.

The novelty of the snow chain shown in FIG. 1 arises from the retaining cord slidably anchoring the inner points of the star-shaped tie cords. Said sliding relationship enables to open up the retaining cord large enough to be slipped over the circumference of the tire with one opening. Without said sliding relationship on the retaining cord, the retaining cord has to be opened at two different points at least to be slipped over the tire. As a consequence, the drive has to reach twice over to the inside of the tire to connect the retaining cord that may well requires rolling the tire twice after each connection of the retaining cord, which is simply unacceptable in view of difficulty involved in reaching into the inside of the tire of many type of automobiles. It should be understood that the use of the sliding relationship in anchoring the tie cord by the retaining cord is made possible by the employment of the star-shaped tie cord assembly, which tie cord arrangement automatically distributes the inner points engaging the retaining cord at equal distances and thus creating the stable configuration of the snow chain, which is imperative for high speed driving.

In FIG. 5, there is shown another embodiment of the principle taught by the present invention, wherein an "easy to install continuous snow chain" 27 including a special arrangement of the retaining cord 28 disposed on the inside of the tire that can be tightened and locked from the outside of the tire. Such a feature is truly novel because it enables the driver to install and take off the snow chain without reaching into the inside of the tire under the automobile. In this embodiment, the extension of retaining cord 28 disposed inside the tire crosses each other through a special connector 39 permitting the sliding movement for the retaining cord 28 and then becomes two sides 35 and 36 of the star-shaped tie cord assembly. After passing through a pair of special connectors 41 allowing the sliding movement, the same retaining cord 28 becomes two segment of the zig-zaging traction cord 31 and 32 and, then, after passing through another special connector 41, the retaining cord 28 becomes two sides 33 and 34 of the star-shaped tie cord assembly disposed on the outside of the tire. Two free ends of the retaining cord 28 emerges from the pair of the special connectors 37 and 38, respectively, each of which ends terminates with a pair of adapters 29 and 30, linking to one aother, respectively. The length of the retaining cord 28 is set in such a way that the retaining cord 28 is made to go around a pair of connectors located diametrically opposite to the special pair of connectors 37 and 38 before two ends of said retaining cord is connected to each other by means of the pair of adapters 29 and 30. The segments of the tie cords 33, 34, 35 and 36 and those of the traction cords 31 and 32 made of the extension of the retaining cord 28 are completely threaded with beads allowing the sliding movement, which beads protects the extension of the retaining cord 28 from the wear and abrasion while providing the additional traction. The remaining portion of the tie cords and the traction cords may be threaded with beads to achieve the symmetry of the snow chain structure as well as for an improved traction. The retaining cord 5 on the outside of the tire does not need any opening any, may be non-slidably connected to the inner points of the star-shaped tie cord assembly by a plurality of connectors 40 and the pair of special connectors 37 and 38.

The "easy to install continuous snow chain" shown in FIG. 5 can be installed as follows: First, disconnect the adapters 29 and 30 on the outside from each other and enlarge the loop of the retaining cord 28 on the inside, which enlarging is facilitated by the two loose free ends of the extension of the retaining cord 28 on the outside fed into the loop inside. Once the loop of the retaining cord is enlarged greater than the circumference of the tire, the snow chain is put over the top of the tire over the three quarter of the tire circumference and, then, after moving car and roll the tire over 180 degrees, the snow chain is completely put around the tire by slipping the loop of the retaining cord 28 over the circumference of the tire. By pulling two free ends of the extension of the retaining cord 28 from the outside of the tire and, then, routing and connecting said two ends by means of the pair of adapters 29 and 30 as shown in FIG. 5, the installation is completed. The same snow chain can be taken off by following the same procedure in the reverse order. It should be understood that, in the above-mentioned procedure of installing and taking off the snow chain, one does not need to reach for the inside of the tire at all as the entire steps of tightening and connecting the adapters is done on the outside of the tire.

In FIGS. 6, 7, 8 and 9, different methods for routing the inside retaining cord to the outside are illustrated wherein, for the sake of the clarity, only the inside retaining cord and its extensions are drawn in solid line, while the remaining structure of the snow chain is drawn in the phantom lines. The connectors are not included in the illustrations.

Figure 6:
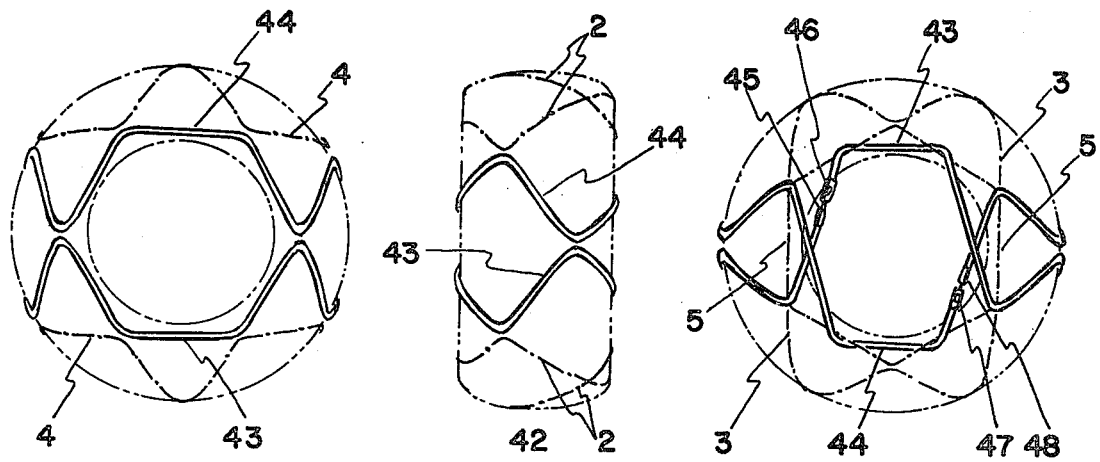

In FIG. 6, the "easy to install continuous snow chain" 42 has a inside retaining cord including a pair of sliding cords 43 and 44, of which extensions are extended to the outside by becoming a segment of the inside tie cord, traction cord and, then, outside tie cord. Each extension of each of said pair of sliding cords 43 and 44 are extended to the outside in a symmetric pattern. In order to provide an additional tension to the structures of the snow chain, each extension of the sliding cords is made to go around and pull a segment of the outside retaining cord before connected to the matching ends by means of two pairs of adapters 45, 46 and 47, 48.

Figure 7:
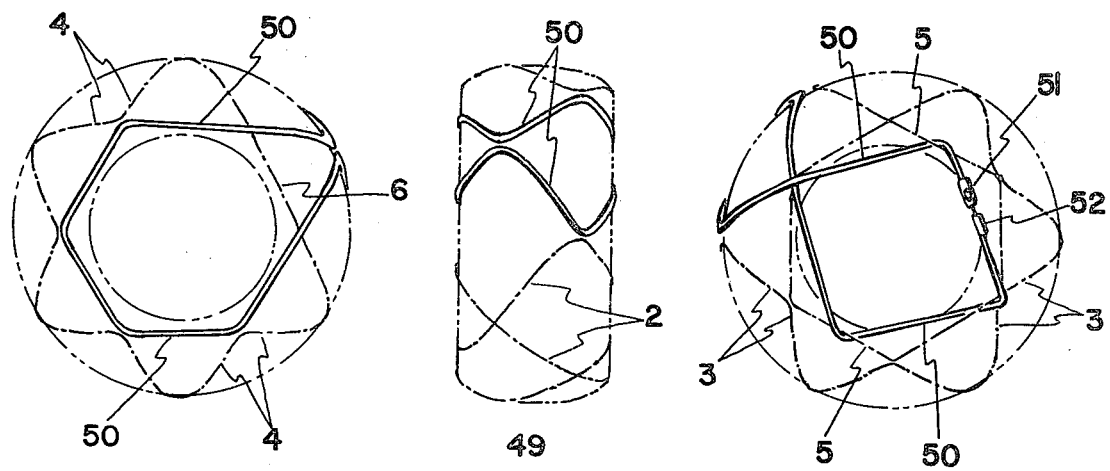

There is shown in FIG. 7 an "easy to install continuous snow chain 49 showing another method of routing the inside retaining cord 50 to the outside in a sliding relationship, wherein the free ends of the extension of said retaining cord are connected to each other by means a pair of adapters 51 and 52. Here, each of the extensions of said retaining cord is routed around a segment of the outside retaining cord before connected to one another to provide additional tension on the snow chain structure.

Figure 8:
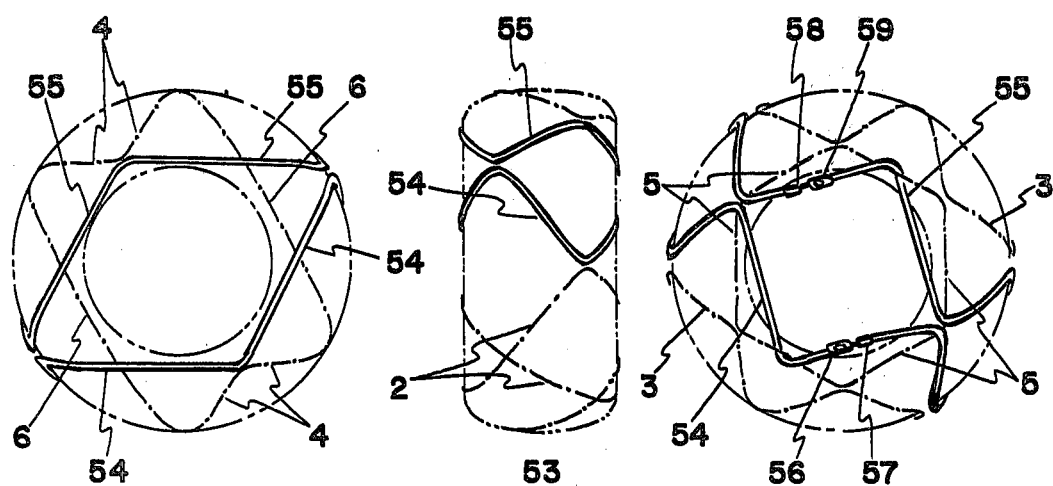

In FIG. 8, there is shown another "easy to install continuous snow chain" 53 illustrating a further method of routing the inside retaining cord to the outside in a sliding relationship, wherein a pair of cord 54 with mating adapters 56 and 57, and cord 55 with mating adapters 58 and 59 are employed.

Figure 9:
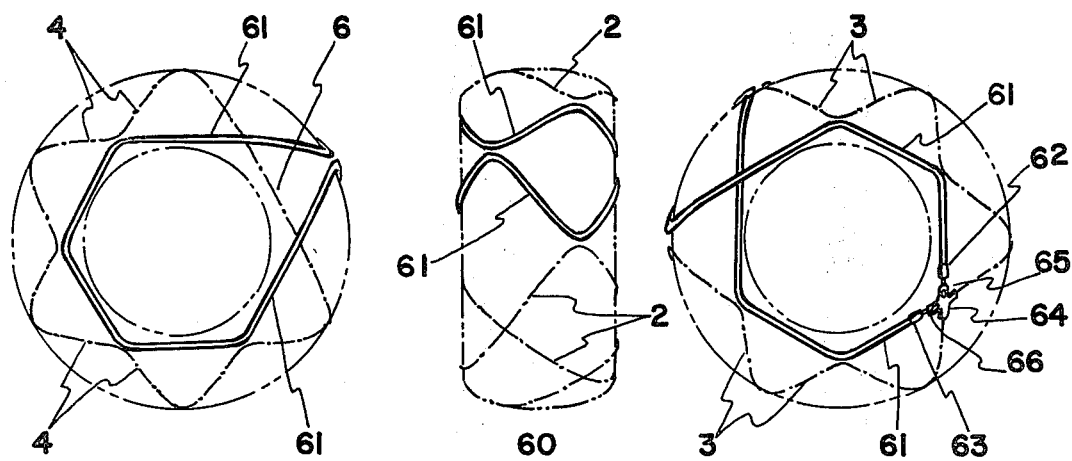

In FIG. 9, there is shown a further "easy to install continuous snow chain" 60 wherein the inside and outside retaining cord is composed of single cord 61 with a pair of adapters 62 and 63 respectly disposed to the each end of said cord, which adapters removably engages matching adapters 65 and 66 disposed on a connector 64 disposed on an inner point of the outside star-shaped tie cord. Here, it should be noticed that one segment 6 of the inside retaining loop is added to the cord 61 in completing the closed loop of the inside retaining cord. When the adapters 62 and 63 are disconnected from the adapters 65 and 66, respectively, the sliding movement of the cord 61 facilitates the enlarging of the inside retaining cord loop, which enables the driver to slip the inside retaining cord loop over the circumference of the tire. Once the snow chain is put around the tire, tightening and closing the cord 61 at the outside completes the installation of the snow chain on the tire.

Figure 10:
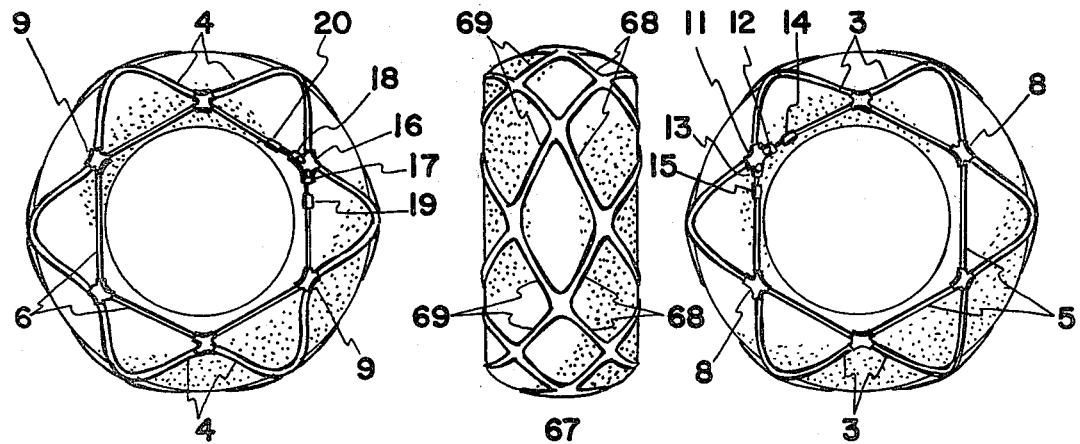

In FIG. 10, there is shown a further embodiment of the principle taught by the present invention. The "easy to install continuous snow chain" 67 employs a diamond pattern instead of a zig-zag pattern in disposing the traction cord around the tread surface of the tire. A pair of traction cord 68 and 69 disposed in a diamond pattern is tied to a pair of retaining cords 5 and 6 by means of a pair of star-shaped tie cord assemblies 3 and 4, respectively, which star-shaped tie cord has the same structures as those shown in FIG. 1. Of course, it is obvious that the method of sliding retaining cords shown in FIGS. 5 through 9 can be readily applied to the snow chain 67 for easy installation and take off. It is also obvious that many other variations for routing the inside retaining cord to the outside in a sliding relationship can be devised by modifying those arrangements shown in FIGS. 5 through 9. Of course, it is also obvious that the traction cords and/or tie cords may be made of the steel chains instead of the bare cords or beaded cords as shown in the drawings.

While the principles of the invention have now been made clear in an illustrative embodiment, there will be immediately obvious to those skilled in this type of work or merely those with sharp eyes many modifications of these structures, arrangement, proportions, the elements, materials and components used in the practice of the invention which are particularly adapted for specific environments and operating requirements without departing from those principles.

I claim:

1. An "easy to install continuous snow chain" comprising:
   (a) an outside star-shaped tie cord assembly;
   (b) an inside star-shaped tie cord assembly;
   (c) a traction cord loop of zig-zag pattern having a stretched circumference length slightly greater than the circumference length of the tread surface of the tire, wherein each of the outside points of said traction cord loop of zig-zag pattern is connected to each of the outer points of said outside star-shaped tie cord assembly and each of the inside points of said traction cord loop of zig-zag pattern is connected to each of the outer points of said inside star-shaped tie cord assembly;
   (d) an outside retaining cord loop slidably or removably engaging each of the inner points of said outside star-shaped tie cord assembly and having one or more adapter means for opening and closing wherein the tension on the closed loop of said outside retaining cord loop creates tension on said outside star-shaped tie cord assembly and said traction cord loop of zig-zag pattern causing said snow chain to be tightly disposed around the tire; and
   (e) an inside retaining cord loop slidably or removably engaging each of the inner points of said inside star-shaped tie cord assembly and having one or more adapter means for opening and closing wherein the tension on the closed loop of said inside retaining cord loop creates tension on said inside star-shaped tie cord assembly and said traction cord loop of zig-zag pattern causing said snow chain to be tightly disposed around the tire.

2. An "easy to install continuous snow chain" comprising:
   (a) an outside star-shaped tie cord assembly;
   (b) an inside star-shaped tie cord assembly;
   (c) a traction cord loop of diamond pattern comprising a pair of cord loops of zig-zag pattern connected to one another in side-by-side fashion, said traction cord loop of diamond pattern having a stretched circumference length slightly greater than the circumference length of the tread surface of the tire, wherein each of the outside points of said traction cord loop of diamond pattern is connected to each of the outer points of said outside star-shaped tie cord assembly and each of the inside points of said traction cord loop of diamond pattern is connected to each of the outer points of said inside star-shaped tie cord assembly;
   (d) an outside retaining cord loop slidably or removably engaging each of the inner points of said outside star-shaped tie cord assembly and having one or more adapter means for opening and closing wherein the tension on the closed loop of said outside rataining cord loop creates tension on said outside star-shaped tie cord assembly and said traction cord loop of diamond pattern causing said snow chain to be tightly disposed around the tire; and
   (e) an inside retaining cord loop slidably or removably engaging each of the inner points of said inside star-shaped tie cord assembly and having one or more adapter means for opening and closing wherein the tension on the closed loop of said inside retaining cord loop creates tension on said inside star-shaped tie cord assembly and said traction cord loop of diamond pattern causing said snow chain to be tightly disposed around the tire.

3. An "easy to install continuous snow chain" comprising:
   (a) an inside retaining cord loop comprising one or more of slidable cords;
   (b) an inside star-shaped tie cord assembly wherein each of the inner points of said inside star-shaped tie cord assembly is slidably engaged by said one or more of slidable cords comprising said inside retaining cord loop, one or more straight segments of said inside star-shaped tie cord assembly being comprised of the extension of said one or more of slidable cords in a slidable arrangement;
   (c) a traction cord loop of zig-zag pattern having a stretched circumference length slightly greater than the circumference of length of the tread surface of the tire, wherein each of the inside points of said traction cord loop of zig-zag pattern is connected to each of the outer points of said inside star-shaped tie cord assemby, one or more straight segments of said traction cord loop of zig-zag pattern being slidably comprised of the extension of said one or more of slidable cords comprising said one or more straight segments of said inside star-shaped tie cord assembly;
   (d) an outside star-shaped tie cord assemby wherein each of the outer points of said outside star-shaped tie cord assembly is connected to each of the outside points of said traction cord loop of zig-zag pattern, one or more straight segments of said outside star-shaped tie cord assembly being slidably comprised of the extension of said one or more of slidable cords comprising said one or more of straight segments of said traction cord loop of zig-zag pattern;

(e) an outside retaining cord loop engaging each of the inner points of said outside star-shaped tie cord assembly; and (f) means for connecting the extension of said one or more of slidable cords comprising one or more of straight segments of said outside star-shaped tie cord assembly to said outside star-shaped tie cord assembly, said means for connecting providing and maintaining a tension on said inside retaining cord loop.

4. The combination as set forth in claim 3 wherein said outside retaining cord loop is comprised of the extension of said one or more of slidable cords slidably comprising said one or more straight segments of said outside star-shaped tie cord assembly, said extension of said one or more slidable cords slidably or removably engaging each of the inner points of said outside star-shaped tie cord assembly.

* * * * *